UNITED STATES PATENT OFFICE.

GEORGE L. SCHAEFER, OF NEW YORK, N. Y., ASSIGNOR TO McKESSON & ROBBINS, OF SAME PLACE.

MEDICAL COMPOUND.

SPECIFICATION forming part of Letters Patent No. 636,218, dated October 31, 1899.

Application filed August 15, 1899. Serial No. 727,303. (No specimens.)

*To all whom it may concern:*

Be it known that I, GEORGE L. SCHAEFER, a citizen of the United States, residing at New York, (Brooklyn,) in the county of Kings and State of New York, have invented certain new and useful Improvements in Antiseptic Compounds; and I do hereby declare the following to be a full, clear, and exact description of the invention, such as will enable others skilled in the art to which it appertains to make and use the same.

This invention relates to a new antiseptic compound intended especially for medicinal purposes; and it consists of the compound hereinafter described and claimed.

My invention consists, generally speaking, in a metallic salt of a sulfonic acid derived from one of the phenols, and particularly in the salts of the guaiacolsulfonic acids.

The phenols, as is well known, are bodies of noxious character, small doses administered internally being usually sufficient to cause death. They have also an irritant action on the skin and mucous surfaces.

The object of my invention is to produce a compound wherein the objectionable and dangerous characteristics of the phenols are eliminated or destroyed, thereby rendering the same practically harmless, and so without materially affecting their known useful and important medicinal and antiseptic qualities. The compound being free from the dangerous and caustic properties of the phenol is also freed from the acidity of the sulfonic-acid derivatives thereof and is a neutral salt, odorless and free from corrosive action.

To produce the phenolsulfonic acids, the guaiacol, which may be taken as typical for this purpose, is sulfonated by treating with concentrated sulfuric acid till the mixture is clearly soluble in cold water. Uncombined guaiacol is then removed by shaking out with ether, benzol, &c. The residual mixture of sulfuric and guaiacolsulfonic acids may then be separated in various manners. If desired, the whole mass may be treated with a suitable base, resulting in a mixture of sulfonate and sulfate, which may be separated by crystallization. Any metallic hydrate, oxide, or carbonate may be used; but if those of lead, calcium, or barium be used the sulfuric acid is at once removed as an insoluble sulfate, leaving the sulfonates in solution, and from these any other metallic sulfonate may of course be obtained by double decomposition. If the proper amount of the foregoing bases be used, a more or less pure solution of free sulfonic acids may be filtered off from the insoluble sulfates, and this is neutralized with the carbonate, oxide, or hydrate of the proper base. These salts may be purified by repeated recrystallization to separate the ortho and para compounds, after which the desired sulfonate can be produced by double decomposition of their salts with a salt of the desired base or by directly neutralizing the free sulfonic acid with the desired hydrate, carbonate, &c. In this connection carbonate, hydrate, or oxide of iron is used. These iron salts are crystallizable, soluble in water and alcohol, and are produced either in distinct crystals containing water of crystallization or as crystalline anhydrous powders. The salts are soluble in hydrochloric acid, forming the corresponding free sulfonic acid and iron chloride. They are broken up by carbonate of sodium, forming an insoluble carbonate of iron and a soluble guaiacol-sulfonate of sodium.

The formula of the iron salt of guaiacolsulfonic acid which I consider the most suitable for medicinal purposes is:

$$2(C_6H_3OHOCH_3SO_3)Fe,$$

in its water-free condition.

I desire it understood that the stated method of producing the guaiacolsulfonic acid is no part of my present invention and that other methods can be employed.

Having thus described my invention, what I claim as new, and desire to secure by Letters Patent, is—

A compound consisting of an iron salt of guaiacolsulfonic acid.

In testimony whereof I affix my signature in presence of two witnesses.

GEORGE L. SCHAEFER.

Witnesses:
　WILH. SCHAD,
　EMIL LACCORN.